United States Patent
Bauer et al.

(10) Patent No.: US 6,890,502 B2
(45) Date of Patent: May 10, 2005

(54) SYNTHETIC CLAY COMPOSITIONS AND METHODS FOR MAKING AND USING

(75) Inventors: Patricia M. Bauer, Gonzales, TX (US); Necip Güven, Lubbock, TX (US); Robert G. Briell, Seguin, TX (US); Milburn I. Knudson, Jr., Gonzales, TX (US)

(73) Assignee: Southern Clay Products, Inc., Gonzales, TX (US)

( * ) Notice: Subject to any disclaimer, the term of this patent is extended or adjusted under 35 U.S.C. 154(b) by 153 days.

(21) Appl. No.: 10/226,377

(22) Filed: Aug. 22, 2002

(65) Prior Publication Data

US 2003/0095906 A1 May 22, 2003

Related U.S. Application Data

(60) Provisional application No. 60/314,702, filed on Aug. 24, 2001.

(51) Int. Cl.⁷ .............................................. C01B 33/40
(52) U.S. Cl. .................. 423/326; 423/328.2; 423/330.1
(58) Field of Search ............................. 423/326, 328.2, 423/330.1, 331, 332

(56) References Cited

U.S. PATENT DOCUMENTS

| | | |
|---|---|---|
| 3,586,478 A | 6/1971 | Neumann |
| 3,666,407 A | 5/1972 | Orlemann |
| 3,671,190 A | 6/1972 | Neumann |
| 3,779,933 A | 12/1973 | Eisen |
| 3,855,147 A * | 12/1974 | Granquist .................. 516/110 |
| 3,892,655 A | 7/1975 | Hickson |
| 4,569,923 A | 2/1986 | Knudson, Jr. et al. |
| 4,664,842 A | 5/1987 | Knudson, Jr. et al. |
| 4,743,305 A | 5/1988 | Doidge et al. |
| 4,749,676 A | 6/1988 | Blumenthal et al. |
| 4,861,510 A * | 8/1989 | Wilms et al. ............... 510/443 |
| 5,110,501 A | 5/1992 | Knudson, Jr. et al. |
| 5,160,454 A | 11/1992 | Knudson, Jr. et al. |
| 5,164,433 A | 11/1992 | Ricci et al. |
| 5,328,590 A | 7/1994 | Occelli |
| 5,393,411 A | 2/1995 | Holmgren |
| 5,525,330 A | 6/1996 | Gaffar et al. |
| 5,798,324 A | 8/1998 | Svoboda |
| 5,919,312 A | 7/1999 | Wierenga et al. |
| 5,981,625 A | 11/1999 | Zou et al. |
| 6,025,295 A | 2/2000 | Tanielyan et al. |
| 6,183,539 B1 | 2/2001 | Rode et al. |
| 6,242,196 B1 | 6/2001 | Spiegelman et al. |

FOREIGN PATENT DOCUMENTS

| | | |
|---|---|---|
| DE | 39 34 473 | 4/1991 |
| DE | 40 15 857 | 11/1991 |
| EP | 614445 B * | 8/1998 |
| GB | 1213122 | 11/1970 |
| GB | 1294253 | 10/1972 |
| GB | 1376379 | 12/1974 |
| GB | 1432770 | 4/1976 |
| GB | 2 164 636 | 3/1986 |
| JP | 05-279012 | 10/1993 |
| JP | 09-267038 | 10/1997 |
| JP | 10 203822 | 8/1998 |
| WO | 01/28924 | 4/2001 |

OTHER PUBLICATIONS

Iwasaki et al. "Rheological Proprerties of Organophilic Synthetic Hectorites and Sapaonites;" *Clays and Clay Minerals*, 1989, 39, 248–257.
International Search Report, Mailed 11, 28, 2002.
United Kingdom Patent Office Search Report for Great Britain Application No.: GB0309620.3; date of report: Jul. 19, 2004, (2 pages).

* cited by examiner

*Primary Examiner*—David Sample
(74) *Attorney, Agent, or Firm*—Meyertons, Hood, Kivlin, Kowert & Goetzel, P.C.; Eric B. Meyertons

(57) ABSTRACT

Selected smectites may be synthesized from a wide variety of components. Morphology, purity, size, and/or shape of the selected smectite may be controlled by mixing the clay smectite formatives, and selectively controlling the pH during mixing. The selected smectites may be used in any applications in which naturally occurring smectite may be used. The selected smectite may also be formulated into an organoclay.

52 Claims, No Drawings

SYNTHETIC CLAY COMPOSITIONS AND METHODS FOR MAKING AND USING

This application claims priority to U.S. Provisional Patent Application No. 60/314,702 entitled "Synthetic Clay Compositions And Methods For Making And Using," filed on Aug. 24, 2001.

BACKGROUND OF THE INVENTION

1. Field of the Invention

The present invention generally relates to processes for making synthetic smectites. More particularly, this invention relates to processes for making a variety of synthetic smectites, including but not limited to synthetic smectites having a variety of charges, sizes, and/or morphologies.

2. Description of the Related Art

Most clay minerals, as found naturally, may be in an impure state and the complete purification of some may be difficult and expensive. Further, there may be situations in which the supply of a clay mineral of a particular chemical composition, either pure or impure, may be insufficient. Thus, it may be desirable to manufacture synthetic clay-like materials in substantially purer forms and/or in more commercially economic yields. Additionally, it may be desirable to manufacture greater quantities of more pure clay-like materials.

It may also be of interest to manufacture synthetic clay-like materials having properties similar to or better than naturally occurring clays. Such improved properties may include improved rheological control, purity, crystallinity, and morphology. Examples of applications in which synthetic clay-like materials with improved properties may be used include, but are not limited to coatings, inks, greases, personal-care products, home-care products, nanocomposites, drilling fluids, pharmaceuticals, catalysis, purification methodologies, or ion-exchange applications.

Different classes of smectites may be synthesized. In synthesized smectites, some of the silicon, aluminum, magnesium, or other ions may be replaced by other ions of different charges. As a result of these substitutions, the structure may acquire a negative charge, which may be neutralized by associated exchangeable cations such as alkali metal cations. Therefore, smectite clay minerals of many different compositions may be made by introducing into the reaction mixture ions desired in the composition. In addition to these elements, sufficient alkali metal compound, in the form of the carbonate or hydroxide may be added, to maintain the solution at the desired alkaline pH throughout the synthesis. The precipitate may then be further processed by filtering, washing, or drying. Additional information pertaining to synthesis of smectites may be found in U.S. Pat. No. 3,586,478 and U.S. Pat. No. 3,671,190 to Neumann, both of which are incorporated herein by reference. U.S. Pat. No. 3,666,407 to Orlemann, which is incorporated herein by reference, describes a method of producing hectorite by calcining a mixture of talc and lithium carbonate followed by subsequent mixing of the calcined material with a sodium silicate and sodium carbonate. The mixture was then hydrothermally treated. U.S. Pat. No. 3,892,655 to Hickson, which is incorporated herein by reference, describes a method of preparing a layer-type, trioctahedral, clay-like material. The layer-type material is prepared by hydrothermal crystallization from aqueous slurries of a mixture of hydrous silica, hydrous alumina, hydrous magnesia and fluoride. The pH is adjusted from about 7 to 10.5 and the slurry is then heated to a temperature of from 550° F. to 700° F. The slurry is stirred under pressure for about 0.5 to 4 hours. U.S. Pat. No. 5,393,411 to Holmgren, which is incorporated herein by reference, describes the preparation of a fluorided beidellite clay. The process reacts a mixture containing reactive sources of aluminum, silicon, a cation salt and a fluoride source. The reaction is carried out a pH of about 4 to 9 at a temperature of about 150° C. to about 300° C.

Current methods may not provide synthetic clay materials with sufficient homogeneity with regard to metal cation ratio, morphological features, and/or reduction of impurities, under commercially economic conditions. Therefore, it may be desirable to provide control over the morphology, size, crystallinity, and/or charge of certain synthetic smectites. It may be desirable to economically produce a material that exhibits improved performance in various applications.

SUMMARY OF THE INVENTION

Embodiments are described herein which provide synthetic smectites, and processes for making synthetic smectites. Such smectites may have improved properties. Examples of improved properties include, but are not limited to, improved purity, crystallinity, morphology and/or rheological control. The synthetic smectites may be made such that a variety of charges, sizes, cation exchange capacity, surface area and/or morphologies may be altered and/or controlled. The control of the precipitation reaction may be used to control when the metals in the synthetic smectite are precipitated. Control of the precipitation reaction may be achieved by monitoring and controlling the pH during the mixing and reaction of the reactant solutions. Selection of the metals to be included in the synthetic smectite may be controlled by the choice of reactant solutions. A further advantage of an embodiment is that a mechanism to increase the yield of selected relatively pure smectites may be available.

Certain embodiments described herein may provide more commercially viable synthetic smectites, and/or processes for making more commercially viable synthetic smectites.

In an embodiment to form a selected smectite, a metal compound solution and a silicate solution may be obtained. The metal compound solution and the silicate solution may be mixed at a pH greater than about 7 in the presence of an alkaline solution.

An alkali fluoride salt may, in some embodiments, be added to the metal compound solution, the silicate solution, and/or the alkaline solution.

A lithium compound may, in some embodiments, be added to the metal compound solution, the silicate solution and/or the alkaline solution. After mixing, the solutions may be heated (e.g., to greater than 100° C.) to eventually produce a selected smectite.

In an embodiment, an alkaline solution and a silicate solution may be mixed at a pH greater than about 7. A metal compound solution may be added to the alkaline silicate solution, when the pH is, e.g., maintained at greater than about 7, to form a selected hydrated metal silicate which may be further treated to form a selected smectite.

In the context of this application, "mixing" (e.g., of two or more reactants) means that one or more first reactants is added to one or more second reactants, that one or more second reactants are added to one or more first reactants, and/or that one or more of the first and second reactants are added to each other.

An alkali fluoride compound may, in some embodiments, be added to any of the aforementioned solutions during mixing.

A lithium compound solution may, in some embodiments, be added to the metal compound solution, the silicate solution, and/or the alkaline solution.

In an embodiment, a metal compound solution and an alkaline solution may be mixed at a pH greater than about 7 to form a selected alkaline metal compound solution. A silicate solution may be mixed with the selected alkaline metal compound solution to form a selected hydrated metal silicate which may be further treated to form a selected smectite.

An alkali fluoride compound may, in some embodiments, be added to any of the aforementioned solutions during mixing.

A lithium compound solution may, in some embodiments be added to the metal compound solution, the silicate solution and/or the alkaline solution.

In some embodiments, the purity of the synthetic smectite may be controlled by the reactants used and/or the quality thereof.

In some embodiments, the charge on the synthetic smectite may be controlled by the selection of metal reactants and other additives that form the synthetic smectite.

Size and shape of the synthetic smectite, and the rate at which such synthetic smectite is formed, may be controlled by addition of lithium compounds and/or fluoride compounds, and/or by varying reaction conditions.

DETAILED DESCRIPTION OF THE INVENTION

A smectite may be generally defined hereinafter as a group of (2:1)-type layer (sheet) silicates with an expandable lattice. Their crystal structures may be defined by an octahedral sheet and two tetrahedral silica sheets condensed on the two sides of the octahedral sheet. The octahedral sheet includes metal octahedra sharing edges with each other. Metal ions in these octahedra may include trivalent ions, divalent ions, and/or lithium ions.

Tetrahedral sheets may be made of silica tetrahedra ($SiO_4$) sharing oxygens with each other. Aluminum (+3) may, in an embodiment, substitute for silicon (+4) ions in tetrahedra and create charge imbalances in the tetrahedral sheet. This is referred to as tetrahedral charge ($\epsilon_t$) with the charge excesses (i.e. negative charges) being substantially located at the oxygens on the basal surfaces of the silicate layers.

Octahedral sites may also have a variety of ionic substitutions creating charge imbalances known as the octahedral charge ($\epsilon_o$) in the form of excess negative charges on the oxygen and hydroxyl ions in the octahedral sheet. These excess charges may be shielded by the tetrahedral sheets; and therefore generate a weak field on the layer (basal) surfaces.

The total excess charge may be equal to the sum of $\epsilon_o$ and $\epsilon_t$. This total layer charge may provide the cation exchange capacity (CEC) of these smectites. Simple cations, cationic complexes of an inorganic or organic nature, dipolar molecules like water or hydrogen-bearing molecules may be attracted to the interlayer space by the residual excess charges on the layers. These hydrated or solvated interlayer complexes may expand the layers and cause swelling.

In an embodiment to produce a selected smectite, a metal compound solution may be obtained (i.e., it may be prepared from available materials or procured from a third party). A metal compound solution may include the water soluble salts of divalent and trivalent metal compounds. Examples of divalent or trivalent metals present as the cation in metal compounds include, but are not limited to magnesium, aluminum, iron, zinc, cobalt, chromium, vanadium, manganese, nickel and/or mixtures thereof. The metal compound solution may include at least two metals in any combination of divalent and trivalent metals. In an embodiment, magnesium and aluminum may be included in the metal compound solution. Anions that may be associated with the metal cation include, but are not limited to chloride, nitrate, sulfate, nitrite, any of the other halides, and/or mixtures thereof.

A silicate solution may also be obtained. The silicate solution may be any solution that provides a source of silicates. Examples of silicate solutions include, but are not limited to alkali metal silicates, alkaline earth metal silicates, sodium silicate, a sodium oxide: silicon dioxide solution commonly known as water glass, and/or mixtures thereof.

The metal compound solution and the silicate solution may be mixed such that the pH in the mixed solution may be maintained at greater than about 7. The solution may be stirred to achieve mixing. The pH may be maintained by mixing the metal compound solution and the silicate solution in the presence of an alkaline solution. The alkaline solution may be any solution that provides pH control such that the pH remains above about 7.

The pH may be controlled such that precipitation of at least one multivalent metal (e.g. amphoteric aluminum) may be controlled. In certain embodiments, the pH is controlled to alter, modify, and/or control precipitation and/or co-precipitation of two or more multivalent metals together. Controlling the pH may thus serve to control the compositions (e.g., hydrated metal silicates) being precipitated, and the charges, sizes, purity, crystallinity, and/or morphology of such compositions. In this manner, selected metal compositions may be formed that provide selected smectites and/or smectite properties. In the context of this application, "selected" means pre-selection of certain properties or materials. In this manner, compositions and/or compositional features may be preplanned (e.g., pre-designed) and then prepared accordingly.

The pH may, for example, be controlled such that two or more multivalent metals precipitate together, instead of one or more of the metals precipitating before one or more of the other metals. In this manner, the resulting smectite, and/or the properties of the resulting smectite, may be selectively altered, modified and controlled in a predetermined manner. It may be possible, for example, to selectively vary the pH during the mixing to thereby selectively create different smectites and/or different smectite properties.

Additionally, it is believed that in certain embodiments the pH control may allow or facilitate the silica remaining in solution as a monomer or as silicate anion. It is to be understood, however, that other mechanisms may also keep the silica in solution. In acidic solutions, silica may tend to polymerize by itself and generate amorphous silica precipitate. Additionally, in solutions with a pH greater than about 10, aluminum ions may have a greater tendency to precipitate out as analcime. In other embodiments, the pH may change depending upon the metals being precipitated and the solubilities of the metals.

Alkaline solutions may be used to control the pH. Examples of alkaline solutions include, but are not limited to alkali carbonate solutions and alkali hydroxide solutions. Examples of alkali carbonates include, but are not limited to lithium, sodium or potassium carbonate. Examples of alkali hydroxides include, but are not limited to lithium, sodium or potassium hydroxide. An alkali fluoride compound may be mixed with the silicate solution, the metal compound solution, or the alkaline solution. Examples of alkali fluoride compounds include, but are not limited to, lithium fluoride or sodium fluoride. A lithium compound may be mixed with the metal compound solution, the silicate solution or the alkaline solution. It is believed that in certain embodiments the addition of lithium may provide for faster and larger crystal growth along with reducing strain between the octahedral and tetrahedral sheets in the selected smectite. It is to be understood, however, that other mechanisms may also cause faster and larger crystal growth and reduced strain.

It is possible to control the pH in certain embodiments by adjusting and/or controlling the pH of the reactants such that the pH during selected mixing/addition processes is then also, in effect, controlled.

In certain embodiments, pH control during mixing may be achieved by adding a pH adjusting compound (e.g., an alkaline solution) to reactants at a point downstream, in a continuous system, of the location wherein the reactants are mixed together.

The solutions may, in some embodiments, be maintained at temperatures below about 100° C. (e.g., 40° C., 50° C., 60° C., 80° C.) during mixing. Concentrations of the metal compound solutions may, in some embodiments, be less than about 2.5 M based on the metal cation. Concentration is defined hereinafter as moles/liter and is designated M. Concentrations of the silicate solution may, in some embodiments, range from about 0.03 M to about 3.5 M based on the silicate anion. Concentrations of lithium compound solutions may, in some embodiments, range from about 0.001 M to about 2 M based on the lithium cation. Concentrations of the alkaline solution may, in some embodiments, be less than about 3.3 M. In other embodiments the alkaline solution may range from about 0.1 M to about 1 M. In some embodiments, about 0.3 M may be desired.

Mixing of the aforementioned solutions may allow a selected hydrated metal silicate to precipitate. The selected hydrated metal silicate may include at least two multivalent metals as discussed previously. Depending upon the choice of the multivalent metals selected, a selected smectite, and/or a smectite with selected properties, may be formed following treatment of the selected hydrated metal silicate. Treatment of the selected hydrated metal silicate may include heating the selected hydrated metal silicate (e.g., to at least 100° C.) and in other embodiments to at least 150° C. or 200° C. The selected smectite formed may be further treated. In some embodiments, it may be treated by washing the selected smectite with water to remove soluble salt compounds, drying the selected smectite and/or milling the selected smectite to a powder. The selected smectite may be dried at temperatures greater than about 60° C. The time required to dry the selected smectite decreases as the drying temperature is increased.

In an embodiment, to produce a selected smectite, a metal compound solution may be obtained. Additionally, an alkaline solution and a silicate solution may be obtained. The alkaline solution and the silicate solution may be mixed such that the pH may be maintained at greater than about 7. The pH control may be conducted for the reasons set forth above (e.g., to alter or control the smectites made, and/or the properties of such smectites). The solutions may be stirred to achieve mixing. The metal compound solution may be mixed with the alkaline silicate solution wherein the pH is maintained at greater than about 7. An alkali fluoride compound may be mixed with the metal compound solution, the silicate solution, and/or the alkaline solution. A source of lithium cations may be mixed with any of the solutions as previously described. The resulting selected hydrated metal silicate may include at least two multivalent metals. In an embodiment, magnesium and aluminum may be included in the metal compound solution.

The selected hydrated metal silicate may be further treated as previously described to form a selected smectite. The solutions may, in some embodiments, be maintained at temperatures below about 100° C. (e.g., 40° C., 50° C., 60° C., 80° C.) during mixing and/or prior to subsequent thermal treatment, if so desired. Concentrations of the metal compound solutions may, in some embodiments, be less than about 2.5 M based on the metal cation. Concentrations of the silicate solution may, in some embodiments, range from about 0.03 M to about 3.5 M based on the silicate anion. Concentrations of lithium compound solutions may, in some embodiments, range from about 0.001 M to about 2 M based on the lithium cation. Concentrations of the alkaline solution may, in some embodiments, be less than about 3.3 M. In other embodiments the alkaline solution may range from about 0.1 M to about 1 M. In some embodiments, about 0.3 M may be desired.

The resulting selected hydrated metal silicate may be further treated at temperatures greater than about 100° C. or 200° C. and in other embodiments at temperatures greater than about 150° C. The resulting selected smectite may be washed to remove soluble salt compounds, dried and/or milled as described previously.

In an embodiment, to produce a selected smectite, a metal compound solution may be obtained. The metal compound solution may include at least two multivalent metals. In an embodiment, magnesium and aluminum may be included in the metal compound solution (in other embodiments other metals may be included). Additionally, an alkaline solution and a silicate solution may be obtained. The alkaline solution and the metal compound solution may be mixed such that the pH may be maintained at greater than about 7. The pH may be controlled for the same reasons as previously described to form a selected alkaline metal compound. The solution may be stirred to achieve mixing. A source of lithium cations may be mixed with any of the solutions.

The selected alkaline metal compound solution may be mixed with the silicate solution to form a selected hydrated metal silicate. The solutions, in some embodiments, maybe maintained at temperatures below about 100° C. (e.g., 40° C., 50° C., 60° C., 80° C.) during mixing and/or prior to subsequent thermal treatment, if so desired. Concentrations of the metal compound solutions may, in some embodiments, be less than about 2.5 M based on the metal cation. Concentrations of the silicate solution may, in some embodiments, range from about 0.03 M to about 3.5 M based on the silicate anion. Concentrations of lithium compound solutions may, in some embodiments, range from about 0.001 M to about 2 M based on the lithium cation. Concentrations of the alkaline solution may, in some embodiments, be less than about 3.3 M. In other embodiments, the alkaline solution may range from about 0.1 M to about 1 M. In some embodiments about 0.3 M may be desired.

The resulting selected hydrated metal silicate may be further treated at temperatures greater than about 100° C. and in other embodiments at temperatures greater than about 150° C. or 200° C. The resulting selected smectite may be washed to remove soluble salt compounds, dried and/or milled, as previously described.

In an embodiment, a selected smectite may be produced in a continuous flow or batch process. In a continuous flow process, the reactant solutions may be fed on a continuous basis to a reaction system and the resulting selected smectite may be continuously withdrawn from the reaction system. Such reaction system may include conduits and/or vessels connected thereto. The product may then be treated further as previously described.

In a batch process, a selected smectite may be produced by adding reactant solutions to a reaction vessel. The solutions may be mixed in the vessel and the subsequent reaction product may be withdrawn when so desired. The order of addition of reactant solutions may be varied. The product may then be treated further as previously described.

It is envisioned that using high shear techniques, such as ultrasonic and homogenizing equipment, may be used in certain embodiments. The shear may be applied during one or more of the reaction stages to influence the course of the reaction, the reaction rate, the products produced, and/or the features of the products produced. Shearing may be used, for example, at the end of the reaction to increase dispersion of the resulting clay. Further information about processing clays through homogenizing equipment may be found in U.S. Pat. Nos. 4,569,923; 4,664,842; 5,110,501; 5,160,454 all to Knudson, Jr. et al., and U.S. Pat. No. 4,743,305 to Doidge et al., all of which are incorporated herein by reference.

In an embodiment, a selected smectite (such as is described herein) may be used as a rheological additive for aqueous compositions, including but not limited to, latex paints or drilling fluids. An organophilic selected smectite clay may be used as a rheological additive for oil-based compositions such as, but not limited to, oil-based drilling fluids or oil-based paints. U.S. Pat. No. 5,164,433 to Ricci et al., which is incorporated herein by reference, provides further information regarding the use of clay as a rheological additive for aqueous systems.

In an embodiment, the selected smectite, as described herein, may be formulated into a printing ink composition. A composition may include about 15 parts to about 25 parts soybean oil, about 15 parts to about 25 parts hydrocarbon oil, about 10 parts to about 20 parts asphaltic resin, about 5 parts to about 15 parts oil modified polyamide, about 0.5 parts to about 2.5 parts oxidized polyethylene, about 25 parts to about 45 parts carbon black, and about 0.1 parts to about 0.5 parts of the selected smectite. Addition of water to this composition may be desirable to produce an emulsified composition. This composition may produce a stable, high resistance to rub-off, printing ink. The components may be blended together in one step and mixed until the desired consistency may be achieved. Other compositions for printing inks may be found in U.S. Pat. No. 5,981,625 to Zou, et al., which is incorporated herein by reference.

The selected smectite as described herein may be used in personal care and home care products. The selected smectite as described herein may be formulated into a toothpaste composition. In an embodiment, a toothpaste may be formulated to provide anti-caries and anti-plaque characteristics. About 25% to about 35% by weight sorbitol may be added to water along with about 0.1% to about 0.5% of the selected smectite. The final amount of water in the formulation may be about 10% to about 50%. Silica may be added to the formulation at about 10% to about 30% by weight of water and the remainder of the formulation may include a fluoride compound for anti-caries activity, flavorings, and anti-bacterial, and anti-plaque additives. The fluoride compounds may include, but are not limited to sodium fluoride, potassium fluoride, sodium monofluorophosphate, and stannous fluoride. Antiplaque compounds may include, but are not limited to tetrasodium pyrophosphate or other soluble pyrophosphate compounds. Anti-bacterial toothpaste formulations may include compounds such as, but not limited to 2,4,4'-trichloro-2'-hydroxydiphenyl ether (Triclosan) or 2,2'-dihydroxy-5,5'-dibromodiphenyl ether. Additional information on formulations may be found in U.S. Pat. No. 5,525,330 to Gaffar, et al., which is incorporated herein by reference.

An oven cleaner may be formulated with the selected smectite as described herein. In an embodiment, an oven cleaner may include, but is not limited to the following composition: water, selected smectite, polymer, solvent, alkali metal hydroxide, and tetrapotassium pyrophosphate. In an embodiment, about 2% of the selected smectite may be dispersed in sufficient water to provide a final water content in the formulation of about 30% to about 50%. Tetrapotassium pyrophosphate may be added at about 0.05% to about 0.15% prior to adding the selected smectite. About 10% to about 25% alkali metal hydroxide may be added after the selected smectite has hydrated. Other components may be added as desired, such as but not limited to, surfactants, solvents, and fragrances. Further formulations and details may be found in U.S. Pat. No. 3,779,933 to Eisen and U.S. Pat. No. 5,919,312 to Wierenga et al., both of which are incorporated herein by reference.

A glass cleaner may be formulated with the selected smectite, as described herein, to produce a non-drip glass cleaner. In an embodiment, about 0.5% to about 1.5% of the selected smectite may be dispersed in water. About 2% to about 10% of an alcohol may be added to the selected smectite dispersion. Examples of an alcohol may include, but are not limited to methanol, ethanol, 1-propanol, isopropanol, and butanol. An oil emulsifier may be added at about 0.5% to about 10% by weight of the formulation. An example of an oil emulsifier may include, but is not limited to an ammonia solution, butoxyethanol, propylene glycol, ethylene glycol, ethylene glycol polymers, polyethylene, or methoxypolyethylene glycols. A surfactant may be added to the formulation at about 0.1% to about 1% by weight. This formulation may provide a non-drip, streak-free composition for surface and glass cleaning. Other formulations may be found in U.S. Pat. No. 5,798,324 to Svoboda, which is incorporated herein by reference.

In an embodiment, the selected smectite may be mixed with a polymerizable organic system to produce nanocomposites. The selected smectite may be compounded into a resin of choice using a twin-screw extruder, but other methods of mixing and extrusion may be used. The selected smectite may also be mixed with a monomer prior to polymerization. When polymerization commences, the selected smectite may be incorporated into the produced polymer. The polymer may then be processed further to form pellets, prills, fibers or such forms which may be used in further processing steps. Examples of further processing steps may include film production, thermoforming, blow molding or injection molding.

The selected smectite, herein described, may be mixed with other polymerizable organic materials to produce a number of different products or articles. The selected smectite may be mixed with the polymerizable organic materials in automobile tires. The selected smectite may be added to impart improved performance of the automobile tire.

In an embodiment, a selected smectite may be used as a catalyst support. The catalyst may include three components: an insoluble support, an anchoring agent, and a metal complex. The selected smectite may serve as an insoluble support. The anchoring agent may serve to link the support to the metal complex. In one embodiment, heteropoly acids may be used. Examples of heteropoly acids may include, but are not limited to phosphotungstic acid, phosphomolybdic acid or silicotungstic acid. The metal complex may be any number of transition metals or their organometallic complexes. The catalyst may be stable in air while retaining or even surpassing the activity and selectivity of the corresponding homogeneous catalyst; but, being insoluble, the catalyst may be easily removed from the reaction mixture and may be capable of extended re-use. U.S. Pat. No. 6,025,295 to Tanielyan et al., which is incorporated herein by reference provides further information concerning catalyst support.

U.S. Pat. No. 5,328,590 to Occelli, which is incorporated herein by reference, teaches the use of clays as catalyst support for reformation or hydrocracking catalysts. The selected smectite, in an embodiment, may also be used as a catalyst support for reformation or hydrocracking catalysts. For reformation or hydrocracking, such smectites may be crystalline, synthetic layered smectites composed of platelets stacked on top of one another to form aggregates in which alkali metal and alkaline earth metal cations may be interposed between the platelets in order to balance charge deficiencies. Each platelet may be visualized as a sandwich with the two outer layers or planes composed primarily of chains containing silicon in tetrahedral coordination with oxygen atoms and the inner layer containing magnesium in octahedral coordination with oxygen atoms. The outer layers may include other elements in addition to silicon and oxygen, while the inner layer may also include elements in addition to magnesium and oxygen. The stacked arrangement of platelets may have a repeating structure about every 10 angstroms.

A selected smectite may be used, in an embodiment, as a binder in the production of a molecular sieve adsorbent. A synthetic or natural zeolite powder may serve as the molecular sieve adsorbent and the selected synthetic smectite may be mixed with the zeolite to serve as a binder. The mixture may then be kneaded with water to form a paste, which may then be aggregated to form shaped articles. U.S. Pat. No. 6,183,539 to Rode et al., which is incorporated herein by reference, teaches the use of clays as binders in adsorbent formulations.

In an embodiment, a selected smectite may be used in pharmaceutical formulations in either solid or liquid forms. In solid dosage forms for oral administration (e.g. capsules, tablets, powders), the active ingredient may be mixed with one or more pharmaceutically acceptable ingredients. Examples of ingredients include, but are not limited to, binders, humectants, absorbents, coloring agents, wetting agents, or disintegrating agents. A selected smectite may, in some embodiments, be used as an absorbent. In other embodiments, the selected smectite may be useful as a binder and/or carrier for bioactive pharmaceutical agents. U.S. Pat. No. 6,242,196 to Spiegelman et al., which is incorporated herein by reference, provides additional information regarding additives for solid and liquid pharmaceutical formulations.

The selected smectite may be made into an organoclay. The selected smectite may be reacted with a quaternary onium compound and subsequently formulated into applications wherein a hydrophobic clay may be desirable. Examples of applications wherein a quaternary onium treated clay may be used include, but are not limited to, drilling fluids, inks, coatings, polymeric materials and nanocomposites.

Those skilled in the art will recognize that applications and reactions that may include a naturally occurring smectite may also include the synthetic smectite.

The following examples serve to illustrate methods of producing selected smectites. The examples should not be considered limiting.

EXAMPLES 1–21

The following general procedure was followed for the synthesis of selected smectites in Examples 1–14 set forth in Tables 1 & 2. Tables 1 & 2 lists specific quantities in grams, reaction times in hours and temperatures in degrees Celsius. A "dash" indicates none of that component was used. The deionized water in all preparations was boiled at 100° C. prior to use, and stored covered if not used immediately. Three separate solutions, designated, as A1, A2 and B in Tables 1 & 2 were prepared in the pre-boiled deionized water. Solution A1 was prepared by adding the indicated amount of sodium carbonate in 400 ml of water with or without the addition of sodium hydroxide as indicated in Tables 1 & 2. Solution A2 was prepared by adding the indicated amount of magnesium and aluminum salts in 500 ml water and stirred for 30 minutes at a temperature range of 80° C. to 90° C. Solution B was prepared by adding the sodium silicate concentrate to 500 ml water and stirred for 30 minutes at a temperature range of 80° C. to 90° C. The lithium fluoride was added to the sodium silicate solution after the initial 30 minutes stirring and the solution was stirred for another 30 minutes at a temperature range of 80° C. to 90° C. A2 M sodium hydroxide solution was prepared and stored in a plastic container. The 2 M sodium hydroxide solution was used to maintain the mixture pH during reaction.

Example 5 will be used to demonstrate/indicate the reaction sequence listed in the "Mixing Sequence" column of Tables 1 and 2. The mixing sequence for Example 5 is indicated in the "Mixing Sequence" column as [A1→B] ←A2. The sodium carbonate (A1) solution was slowly transferred to the sodium silicate/lithium fluoride (B) solution with a peristaltic pump over a time frame of 30 minutes while stirring the solution on a hot plate to maintain the solution temperature in the range of 80° C. to 90° C. The magnesium/aluminum solution (A2) was then slowly added to the A1/B mixture while maintaining the pH at a range of 9.0 to 9.5 by addition of small aliquots of the 2 M sodium hydroxide solution. This pH range is appropriate for magnesium and aluminum; other pH ranges could and would be used for other metals as required to control the precipitation and/or co-precipitation of those metals. In some of the examples, the mixing sequence was modified from this procedure (see the "Mixing Sequence" column in Tables 1 & 2). The pH was controlled in the step of the mixing sequence where the A2 solution was added. After mixing, the solutions were reacted for one hour prior to transferring the entire solution (including the resulting precipitate) to an autoclave high-pressure reactor.

The autoclave high-pressure reactor was programmed to ramp to the desired temperature over the indicated period of time and then the mixture was allowed to react at that desired temperature. The autoclave was then ramped to the reaction temperature and allowed to remain at that temperature for the indicated length of time. In Tables 1 & 2, the term "ramp-hold" refers to the ramping time followed by the hold time. For example, in Example 10 in Table 2, the system is heated to 100° C. over a 5-hour ramp time and then is held at 100° C. for 5 hours, and then the reactor is heated to 200° C. over a 10-hour ramp time and then is held at 200° C. for 20 hours. Variations from the ramp-hold at two separate temperatures are given in the "Reactor Time" column for certain specific samples. For example, in Example 11 in Table 2, the system was heated to 260° C. over a 1.5-hour ramp time and then held at 260° C. for 15 minutes. After reaction, the autoclave was allowed to cool and the reaction product was washed to remove excess reactants. The material was washed, and then the filtrate was tested for conductivity, until a conductivity of about 500 microsiemens was achieved. The reaction product was collected and dried overnight in an oven at 110° C. and later milled to a fine powder.

The following general procedure was followed for the synthesis of selected smectites in Examples 15–21 in Table 3. Table 3 lists specific quantities in grams, reaction times in minutes or in hours, and temperatures in degrees Celsius. The deionized water in all preparations was boiled at 100° C. prior to use, and stored covered if not used right away. Three separate solutions, designated as A1, A2 and B in Table 3, were prepared using pre-boiled deionized water. Solution A1 was prepared by adding the indicated amount of sodium carbonate in 400 ml of water. Solution A2 was prepared by adding the indicated amount of magnesium salt to 500 ml water while stirring and then heated to about 80° C. Once the 80° C. temperature was reached, the indicated amount of aluminum salt was added to the magnesium salt solution and stirred for 30 minutes while the temperature was maintained in the range of 80° C. to 90° C. Solution B was prepared by adding the sodium silicate concentrate to 500 ml water and stirred for 30 minutes while the temperature was maintained in the range of 80° C.–90° C. A 2 M sodium hydroxide solution was prepared and stored in a plastic container. The 2 M sodium hydroxide solution was used to maintain the mixture pH during the appropriate step of the reaction.

The mixing sequence for the examples in Table 3 was ([A2→A1]←LiF)→B. The magnesium/aluminum solution (A2) was slowly added to the sodium carbonate (A1) solution with a peristaltic pump over a time frame of about 30 minutes while stirring the solution on a hot plate to maintain the solution temperature in the range of 80° C.–90° C. During addition of A2 to A1, the solution was kept at a pH range of 9.0 to 9.5 by addition of small aliquots of the 2 M sodium hydroxide solution. This pH range is appropriate for magnesium and aluminum; other pH ranges could and would be used for other metals as required to control the precipitation and/or co-precipitation of those metals. This A1/A2 mixture was maintained at a temperature range of 80° C.–90° C. while stirring for about 2 hours. Next, the indicated amount of lithium fluoride was added to the A1/A2 mixture and then the temperature was maintained at a range of 80° C.–90° C. while stirring for about 30 minutes. This solution was added to the sodium silicate (B) solution with a peristaltic pump over a time frame of 30 minutes while stirring the solution in a glass reaction vessel. A heating mantle was used to maintain the solution temperature in the range of 80° C. to 90° C. After mixing, the solutions were reacted under reflux for two hours at 100° C. prior to transfer of the entire solution (including the resulting precipitate) to an autoclave high-pressure reactor.

The autoclave high-pressure reactor was programmed to ramp to 260° C. as quickly as possible (approximately 1.5 hours) and then the solution was maintained at 260° C. for 15 minutes as indicated in Table 3 in the "Reactor Times" column. After reaction, the autoclave was allowed to cool and the reaction product was washed of the excess reactants. The material was washed, and then the filtrate was tested for conductivity, until a conductivity of about 500 microsiemens was achieved. The reaction product was collected, dried overnight in a blower oven at 80° C., and later milled to a fine powder.

In Tables 1–3, with respect to smectite morphology the term "mossy" means a structure that, when magnified, appears like a mass of moss (e.g., a bundle of loosely bound strands), the term "thin foils" means a structure, when magnified, appears like separated (or foliated) particles that are loosely packed and include at least some folded and/or crumpled sheets, the term "mossy-foily" means a structure that, when magnified, has at least some features attributable to both mossy and thin foil structures, and the term "dense aggregate" means a structure that, when magnified, appears like a mass of tightly packed particles. It is to be understood that the above descriptions are qualitative and subject to visual interpretation. In Tables 1–3 the morphologies described therein are the predominant morphologies observed.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

TABLE 1

Composition and Reaction Conditions for Synthesis of Selected Smectite and Smectite Properties

| Example | Solution A1 Na$_2$CO$_3$ (g)/ NaOH (g) | Solution B NaSilicate (29.0% SiO$_2$) (g)/LiF (g) | Solution A2 MgCl$_2$.6H$_2$O (g)/30% AlCl$_3$ - conc. (g) | Reactor times (ramp-hold time in hr) @ 100° C./200° C. | Smectite Morphology* | Mixing Sequence: control of pH occurs when A2 is added |
|---|---|---|---|---|---|---|
| 1 | 22.2/— | 51.16/1.6 | 28.12/12.26 | 5-5/10-10 | dense aggregate | [A2→A1]←B |
| 2 | 22.2/— | 51.16/1.6 | 27.43/15.08 | 5-5/10-10 | dense aggregate | [A2→A1]←B |
| 3 | 22.2/— | 51.16/1.6 | 25.72/18.85 | 5-5/10-10 | dense aggregate | [A2→A1]←B |
| 4 | 22.2/— | 51.16/1.6 | 27.43/15.08 | 5-5/10-20 | mossy-foily | [A2→A1]←B |

TABLE 1-continued

Composition and Reaction Conditions for Synthesis of Selected Smectite and Smectite Properties

| Example | Solution A1 Na₂CO₃ (g)/ NaOH (g) | Solution B NaSilicate (29.0% SiO₂) (g)/LiF (g) | Solution A2 MgCl₂.6H₂O (g)/30% AlCl₃ - conc. (g) | Reactor times (ramp-hold time in hr) @ 100° C./200° C. | Smectite Morphology* | Mixing Sequence: control of pH occurs when A2 is added |
|---|---|---|---|---|---|---|
| 5 | 22.2/3.0 | 51.16/1.6 | 27.43/15.08 | 5-5/10-26 | mossy-foily | [A1→B]←A2 |
| 6 | 22.2/— | 51.16/— | 27.43/15.08 | 5-5/10-19 | no EM; mostly analcime (based on XRD) | [A1→B]←A2 |
| 7 | 11.1/— | 25.58/1.6 | 13.72/7.54 | 5-5/10-20 | mossy-foily | [A1→B]←A2 |
| 8 | 22.2/— | 51.16/3.2 | 27.43/15.08 | 5-5/10-20 | mossy-foily | [A1→B]←A2 |
| 9 | 44.4/— | 102.32/6.4 | 54.88/30.16 | 5-5/10-20 | mossy-foily | [A1→B]←A2 |

— indicates not added
*smectite morphology determined by EM (electron micrographs). XRD means x-ray diffraction.

TABLE 2

Composition and Reaction Conditions for Synthesis of Selected Smectite and Smectite Properties

| Example | Solution A1 Na₂CO₃ (g)/ NaOH (g) | Solution B NaSilicate (28.6% SiO₂) (g)/ LiF (g) | Solution A2 MgCl₂.6H₂O (g)/ AlCl₃.6H₂O (g) | Reactor times (ramp-hold time in hr) @ 100° C./200° C. unless otherwise stated | Smectite Morphology* | Mixing Sequence: control of pH occurs when A2 is added | CEC⁺ meq/100 g |
|---|---|---|---|---|---|---|---|
| 10 | 44.4/— | 103.74/6.4 | 54.88/16.29 | 5-5/10-20 | mossy-foily | [A1→B]←A2 | 130 |
| 11 | 44.4/— | 103.74/6.4 | 54.88/16.29 | Ramp to 260° C. in 1.5 hrs and hold 15 minutes | mossy-foily | [A1→B]←A2 | 130 |
| 12 | 44.4/— | 103.74/6.4 | 54.88/16.29 | 5-5/10-20 + 3.5 hrs @ 30° C. before reaction | mossy-foily | [A1→B]←A2 | 134 |
| 13 | 44.4/— | 103.74/6.4 | 54.88/16.29 | Ramp to 260° C. in 1.5 hrs and hold 30 minutes | thin foils | [A1→B]←A2 | 134 |
| 14 | 44.4/— | 103.74/6.4 | 54.88/16.29 | Ramp to 260° C. in 1.5 hrs and hold 3 hours | thin foils | [A1→B]←A2 | 131 |

— indicates not added
*smectite morphology determined by EM (electron micrographs)
⁺CEC = cation exchange capacity in milliequivalents per 100 grams smectite

TABLE 3

Composition and Reaction Conditions for Synthesis of Selected Smectite and Smectite Properties

| Example | Solution A1 Na₂CO₃ | Solution B NaSilicate (28.6% SiO₂) (g) | Solution A2 MgCl₂.6H₂O (g)/ AlCl₃.6H₂O (g)/ LiF (g) | Reactor times ramp/hold times at 260° C. | Smectite Morphology* | Mixing Sequence: control of pH occurs when A2 is added | CEC⁺ meq/100 g |
|---|---|---|---|---|---|---|---|
| 15 | 44.4 | 97.2 | 55.2/12.6/0.6 | ~1.5 hours/15 minutes | dense aggregates | ([A2→A1]←LiF)→B | 70 |
| 16 | 44.4 | 97.2 | 57.0/8.4/0.8 | ~1.5 hours/15 minutes | dense aggregates | ([A2→A1]←LiF)→B | 82 |
| 17 | 44.4 | 97.2 | 57.0/2.1/1.5 | ~1.5 hours/15 minutes | mossy-foily | ([A2→A1]←LiF)→B | 84 |
| 18 | 44.4 | 97.2 | 60.5/6.3/0.6 | ~1.5 hours/15 minutes | dense aggregates | ([A2→A1]←LiF)→B | 84 |
| 19 | 44.4 | 97.2 | 58.7/4.2/1.0 | ~1.5 hours/15 minutes | dense aggregate | ([A2→A1]←LiF)→B | 86 |
| 20 | 44.4 | 97.2 | 55.2/6.3/1.3 | ~1.5 hours/15 minutes | dense aggregates | ([A2→A1]←LiF)→B | 82 |
| 21 | 44.4 | 97.2 | 62.3/2.1/0.8 | ~1.5 hours/15 minutes | dense aggregates | ([A2→A1]←LiF)→B | 72 |

*smectite morphology determined by EM (electron micrographs)
⁺CEC = cation exchange capacity in milliequivalents per 100 grams smectite

What is claimed is:
1. A method of making a selected smectite, comprising:
   obtaining a metal compound solution, the metal compound solution comprising at least two multivalent metals;
   obtaining a silicate solution;
   mixing the metal compound solution and the silicate solution, wherein the pH in the mixed solution is maintained at greater than about 7.0, and wherein the metal compound solution and the silicate solution are maintained at a temperature in a range from about 40° C. to about 100° C. during mixing;

controlling the pH to form a selected hydrated metal silicate comprising at least two multivalent metals;

allowing at least a portion of the selected hydrated metal silicate to precipitate; and using at least a portion of the selected hydrated metal silicate to form a selected smectite.

2. The method of claim 1, wherein the metal compound solution and the silicate solution are mixed in the presence of an alkaline solution.

3. The method of claim 1, further comprising mixing an alkaline solution with the metal compound solution.

4. The method of claim 1, further comprising mixing an alkaline solution with the silicate solution.

5. The method of claim 1, further comprising mixing an alkali fluoride compound with the metal compound solution.

6. The method of claim 1, further comprising mixing an alkali fluoride compound with the silicate solution.

7. The method of claim 1, wherein the metal compound solution and the silicate solution are mixed in the presence of an alkaline solution, and further comprising mixing an alkali fluoride compound with the alkaline solution.

8. The method of claim 1, wherein the metal compound solution and the silicate solution during mixing are maintained at a temperature in a range from about 60° C. to about 100° C.

9. The method of claim 1, wherein the metal compound solution and the silicate solution are stirred during mixing.

10. The method of claim 1, further comprising heating the mixture of metal compound solution and silicate solution to at least 100° C. subsequent to mixing the metal compound solution and the silicate solution together.

11. The method of claim 1, further comprising heating the mixture of metal compound solution and silicate solution to at least 150° C. subsequent to mixing the metal compound solution and the silicate solution together.

12. The method of claim 1, further comprising washing the selected smectite to remove soluble salt compounds.

13. The method of claim 1, further comprising drying the selected smectite at a temperature range greater than about 600° C.

14. The method of claim 1, further comprising milling the selected smectite to a powder.

15. The method of claim 1, wherein the metal compound solution and the silicate solution are mixed in the presence of an alkaline solution, and wherein the alkaline solution comprises an alkali carbonate compound.

16. The method of claim 1, wherein the metal compound solution and the silicate solution are mixed in the presence of an alkaline solution, and wherein the alkaline solution comprises an alkali hydroxide.

17. The method of claim 1, wherein the metal compound solution and the silicate solution are mixed in the presence of an alkaline solution, and wherein the alkaline solution comprises sodium carbonate.

18. The method of claim 1, wherein the metal compound solution and the silicate solution are mixed in the presence of an alkaline solution, and wherein the alkaline solution comprises sodium hydroxide.

19. The method of claim 1, wherein the silicate solution comprises an alkali metal silicate.

20. The method of claim 1, wherein the silicate solution comprises an alkaline earth metal silicate.

21. The method of claim 1, wherein the silicate solution comprises a sodium silicate.

22. The method of claim 1, wherein at least one of the multivalent metals comprises magnesium.

23. The method of claim 1, wherein at least one of the multivalent metals comprises aluminum.

24. The method of claim 1, wherein at least one of the multivalent metals comprises iron.

25. The method of claim 1, wherein at least one of the multivalent metals comprises zinc.

26. The method of claim 1, wherein at least one of the multivalent metals comprises cobalt.

27. The method of claim 1, wherein at least one of the multivalent metals comprises chromium.

28. The method of claim 1, wherein at least one of the multivalent metals comprises vanadium.

29. The method of claim 1, wherein at least one of the multivalent metals comprises manganese.

30. The method of claim 1, wherein at least one of the multivalent metals comprises nickel.

31. The method of claim 1, wherein the multivalent metals comprise a combination of magnesium and aluminum.

32. The method of claim 1, wherein the metal compound solution comprises water soluble salts of multivalent metals.

33. The method of claim 1, wherein the metal compound solution comprises an anion.

34. The method of claim 33, wherein the anion comprises at least one chloride.

35. The method of claim 33, wherein the anion comprises at least one nitrate.

36. The method of claim 33, wherein the anion comprises at least one sulfate.

37. The method of claim 33, wherein the anion comprises at least one nitrite.

38. The method of claim 33, wherein the anion comprises at least one halide.

39. The method of claim 1, wherein the pH is controlled such that the metals and silicas are co-precipitated.

40. The method of claim 1, further comprising mixing one or more lithium compounds with the metal compound solution.

41. The method of claim 1, further comprising mixing one or more lithium compounds with the silicate solution.

42. The method of 1, wherein the metal compound solution and the silicate solution are mixed in the presence of an alkaline solution and further comprising mixing one or more lithium compounds with the alkaline solution.

43. The method of claim 1, wherein the metal compound solution is less than about 2.5 M based on at least one metal cation.

44. The method of claim 1, wherein the silicate solution is about 0.03 M silicate to about 3.5 M silicate.

45. The method of claim 1, wherein the metal compound solution and the silicate solution are mixed in the presence of an alkaline solution wherein the alkaline solution is less than about 3.3 M.

46. The method of claim 1, wherein the metal compound solution and the silicate solution are mixed in the presence of an alkaline solution wherein the multivalent metals comprise magnesium and aluminum, the alkaline solution comprises carbonate, and the silicate solution comprises sodium silicate.

47. The method of claim 1, wherein the metal compound solution is mixed in the presence of the silicate solution and an alkaline solution.

48. The method of claim 1, wherein the silicate solution is mixed in the presence of the metal compound solution and an alkaline solution.

49. The method of claim 1, wherein the metal compound solution, the silicate solution and an alkaline solution are mixed simultaneously.

50. A method of making a selected smectite, comprising:

obtaining a metal compound solution, the metal compound solution comprising at least two multivalent metals;

obtaining an alkaline solution;

obtaining a silicate solution;

mixing the alkaline solution and the silicate solution to form an alkaline silicate solution, and wherein the pH in the alkaline silicate solution is maintained at greater than about 7.0;

mixing the metal compound solution with the alkaline silicate solution, and controlling the pH during at least a portion of such mixing to form a selected hydrated metal silicate comprising at least two multivalent metals, and wherein the metal compound solution and the alkaline silicate solution are maintained at a temperature in a range from about 40° C. to about 100° C. during mixing;

allowing at least a portion of the selected hydrated metal silicate to precipitate; and using at least a portion of the selected hydrated metal silicate to form a selected smectite.

51. A method of making a selected smectite, comprising:

obtaining a metal compound solution, the metal compound solution comprising at least two multivalent metals;

obtaining an alkaline solution;

obtaining a silicate solution;

mixing the alkaline solution and the metal compound solution to form an alkaline metal compound solution, and wherein the pH of the alkaline metal compound solution is maintained at greater than about 7.0, controlling the pH during at least a portion of the mixing to form a selected alkaline metal compound solution comprising at least two multivalent metals, and wherein the alkaline metal compound solution and the silicate solution are maintained at a temperature in a range from about 40° C. to about 100° C. during mixing;

mixing the silicate solution with the selected alkaline metal compound solution to form a selected hydrated metal silicate;

allowing at least a portion of the selected hydrated metal silicate to precipitate; and using at least a portion of the selected hydrated metal silicate to form a selected smectite.

52. The method of claim 1, wherein the multivalent metals comprise magnesium and aluminum, the alkaline solution comprises carbonate, the silicate solution comprises sodium silicate, and further comprising mixing lithium fluoride to the alkaline solution, metal compound solution, or silicate solution.

* * * * *

UNITED STATES PATENT AND TRADEMARK OFFICE
CERTIFICATE OF CORRECTION

PATENT NO. : 6,890,502 B2
DATED : May 10, 2005
INVENTOR(S) : Bauer et al.

It is certified that error appears in the above-identified patent and that said Letters Patent is hereby corrected as shown below:

Column 15,
Line 40, please delete "600º C" and substitute therefor -- 60º C --.

Column 16,
Line 40, please delete "The method of 1," and substitute therefor -- "The method of claim 1," --.

Signed and Sealed this

Sixteenth Day of August, 2005

JON W. DUDAS
*Director of the United States Patent and Trademark Office*